(12) United States Patent
Breau et al.

(10) Patent No.: US 7,817,615 B1
(45) Date of Patent: Oct. 19, 2010

(54) CROSS-NETWORK QUALITY-OF-SERVICE VERIFICATION

(75) Inventors: Jeremy R. Breau, Kansas City, MO (US); Gary Joel Rieschick, Louisburg, KS (US); Frederick C. Rogers, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 65 days.

(21) Appl. No.: 12/167,389

(22) Filed: Jul. 3, 2008

(51) Int. Cl.
*H04W 8/20* (2009.01)
(52) U.S. Cl. .................................. 370/349; 370/395.21
(58) Field of Classification Search ........................ None
See application file for complete search history.

(56) References Cited

U.S. PATENT DOCUMENTS

| | | | | |
|---|---|---|---|---|
| 6,621,793 | B2 * | 9/2003 | Widegren et al. | 370/230.1 |
| 7,106,718 | B2 * | 9/2006 | Oyama et al. | 370/340 |
| 2002/0101859 | A1 * | 8/2002 | Maclean | 370/352 |
| 2003/0053464 | A1 * | 3/2003 | Chen et al. | 370/400 |
| 2005/0144327 | A1 | 6/2005 | Rabie et al. | |
| 2007/0116004 | A1 * | 5/2007 | Kang et al. | 370/395.2 |
| 2008/0112363 | A1 * | 5/2008 | Rahman et al. | 370/331 |

OTHER PUBLICATIONS

Steven Blake, et al., "An Architecture for Differentiated Services," Dec. 1998, pp. 1-37, Torrent Networking Technologies, Morrisville, North Carolina; EMC Corporation, Hopkinton, Massachusetts; Sun Microsystems, Inc., Boulder, Colorado; Nortel UK, Harlow, Essex, United Kingdom; http://tools.ietf.org/html/rfc2475.

Kathleen Nichols, et al., "Definition of the Differentiated Services Field (DS Field) in the IPv4 and IPv6 Headers," Dec. 1998, pp. 1-21, Cisco Systems, San Jose, California; Torrent Networking Technologies, Morrisville, North Carolina; Cisco Systems, Santa Barbara, California; EMC Corporation, Hopkinton, Massachusetts; http://tools.ietf.org/html/rfc2474.

K.K. Ramakrishnan, et al., The Addition of Explicit Congestion Notification (ECN) to IP,' Sep. 2001, pp. 1-64, TeraOptic Networks, Inc.; ACIRI; EMC Corporation, Hopkinton, Massachusetts; http://tools.ietf.org/html/rfc3168.

* cited by examiner

*Primary Examiner*—Steven H Nguyen
*Assistant Examiner*—Alex Skripnikov

(57) ABSTRACT

What is disclosed is a system and method wherein a wireless access system configured to receive a data packet with a first quality-of-service indicator value from a wireless device over a wireless link, provide a first level of service to the wireless device over the wireless link based on the first quality-of-service indicator, and transfer the data packet with the first quality-of-service indicator. The communication system includes a core packet network configured to receive the data packet with the first quality-of-service indicator and determine if the first quality-of-service indicator is consistent with a quality-of-service policy for the wireless device. The core packet network is configured, if the first quality-of-service indicator is not consistent with the quality-of-service policy for the wireless device, to determine a second quality-of-service indicator consistent with the quality-of-service policy for the wireless device, and transfer the data packet with the second quality-of-service indicator. The wireless access system is configured to receive the data packet with the second quality-of-service indicator, and provide a second level of service to the wireless device over the wireless link based on the second quality-of-service indicator.

20 Claims, 5 Drawing Sheets

CROSS-NETWORK QUALITY-OF-SERVICE VERIFICATION

TECHNICAL BACKGROUND

Data packets transferred across computer networks can contain various indicators to notify network equipment, such as gateways and routers, as to status and properties of the data. One indicator is a quality-of-service (QoS) indicator, the value of which indicates to network equipment the level of service a data packet should receive. This can be useful in packet-based networks, such as the Internet, where data packet transmission times are highly variable and dependent upon traffic patterns and congestion. The level of service correlating to a particular quality-of-service indicator value can be based upon many factors, some of which include network congestion status, data traffic type (i.e. video or email), or by agreement between the network provider and the data originator or recipient.

One example quality-of-service indicator is the Differentiated Services Code Point (DSCP) field in the header of IP data packets. Another example is the Multi Protocol Label Switching (MPLS) prefix which can contain a quality-of-service indicator. These quality-of-service indicators can indicate to network equipment a level of service that a data packet should receive when passing through such network equipment.

OVERVIEW

A communication system is disclosed which includes a wireless access system configured to receive a data packet with a first quality-of-service indicator value from a wireless device over a wireless link, provide a first level of service to the wireless device over the wireless link based on the first quality-of-service indicator, and transfer the data packet with the first quality-of-service indicator. The communication system includes a core packet network configured to receive the data packet with the first quality-of-service indicator and determine if the first quality-of-service indicator is consistent with a quality-of-service policy for the wireless device. The core packet network is configured, if the first quality-of-service indicator is not consistent with the quality-of-service policy for the wireless device, to determine a second quality-of-service indicator consistent with the quality-of-service policy for the wireless device, and transfer the data packet with the second quality-of-service indicator. The wireless access system is configured to receive the data packet with the second quality-of-service indicator, and provide a second level of service to the wireless device over the wireless link based on the second quality-of-service indicator.

Another example is a method of operating a communication system, which includes, in a wireless device, transferring a data packet with a first quality-of-service indicator over a wireless link. The method includes, in a wireless access system, receiving the data packet with the first quality-of-service indicator, applying a first level of service to the wireless device over the wireless link based on the first quality-of-service indicator, and transferring the data packet with the first quality-of-service indicator. The method includes, in a core packet network, receiving the data packet with the first quality-of-service indicator and determining if the first quality-of-service indicator is consistent with a quality-of-service policy for the wireless device. If the first quality-of-service indicator is not consistent with the quality-of-service policy for the wireless device, determining a second quality-of-service indicator consistent with the quality-of-service policy for the wireless device, and transferring the data packet with the second quality-of-service indicator. The method includes, in the wireless access system, receiving the data packet with the second quality-of-service indicator, and providing a second level of service to the wireless device over the wireless link based on the second quality-of-service indicator.

BRIEF DESCRIPTION OF THE DRAWINGS

In the drawings, like reference numerals designate corresponding parts throughout the several views.

DETAILED DESCRIPTION

Figure 1:
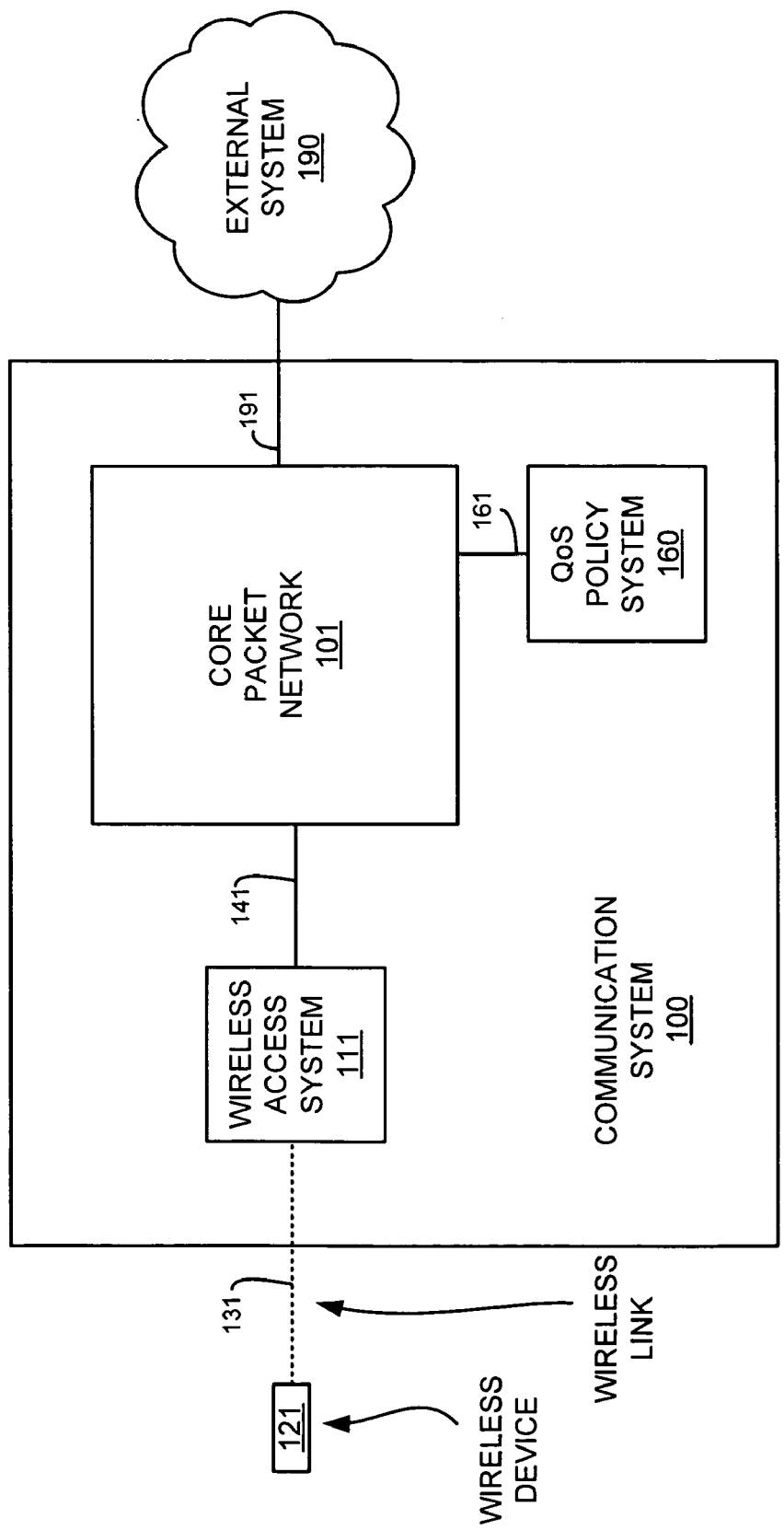
FIG. 1 is a system diagram illustrating a communication system.

FIG. 1 is a block diagram that illustrates communication system 100. Communication system 100 includes core packet network 101, wireless access system 111, and quality-of-service (QoS) policy system 160. FIG. 1 also shows wireless device 121 and external system 190. Wireless device 121 and wireless access system 111 communicate over wireless link 131. Wireless access system 111 and core packet network 101 communicate over link 141. Core packet network 101 and quality-of-service policy system 160 communicate over link 161. Core packet network 101 and external system 190 communicate over link 191.

Wireless device 121 includes a telephone, transceiver, computer, digital assistant, Internet appliance, or some other wireless communication apparatus—including combinations thereof. Wireless access system 111 and core packet network 101 can be any type of communications network equipment capable of receiving and transmitting data packets. Wireless access system 111 includes a radio node controller (RNC), wireless base station, wireless access point, telephone switch, Internet router, network gateway, or some other type of communication equipment—including combinations thereof. Core packet network 101 could include routers, switches, gateways, servers, or some other type of communication network or equipment—including combinations thereof. Quality-of-service policy system 160 comprises a computer system or special purpose circuitry which may include a storage system, database, user service profile directory, or some other type of directory or listing—including combinations thereof. Quality-of-service policy system 160 could be located within core network 101, or located remotely from core network 101. External system 190 could include an Internet network, wireless network, telephony network, optical network, enterprise network, local area network, or some other type of communication network or communication device—including combinations thereof.

Wireless link 131 uses the air or space as the transport media. Wireless link 131 could use various protocols, such as wireless fidelity (WiFi), code division multiple access (CDMA), worldwide interoperability for microwave access (WiMAX), Internet, Internet protocol (IP), local-area network (LAN), telephony, or some other communication format—including combinations thereof. Links 141, 161, and 191 use various communication media, such as air, metal, optical fiber, or some other signal propagation path—including combinations thereof. Links 141, 161, and 191 use various protocols, such as Internet, Internet protocol, local-area network, telephony, optical networking, wireless communication, wireless fidelity, code division multiple access, worldwide interoperability for microwave access, or some other communication format—including combinations thereof. Links 141, 161, and 191 could be direct links or it might include various equipment, intermediate components, systems, and networks.

Data packets are transferred between wireless device 121 and wireless access system 111 over wireless link 131. Data packets received in wireless access system 111 can be transferred to core packet network 101 or back to wireless device 121 over wireless link 131. Core packet network 101, for example, can transfer data packets between wireless access system 111 over link 141 and external system 190 over link 191, or back to wireless access system 111.

Figure 2:
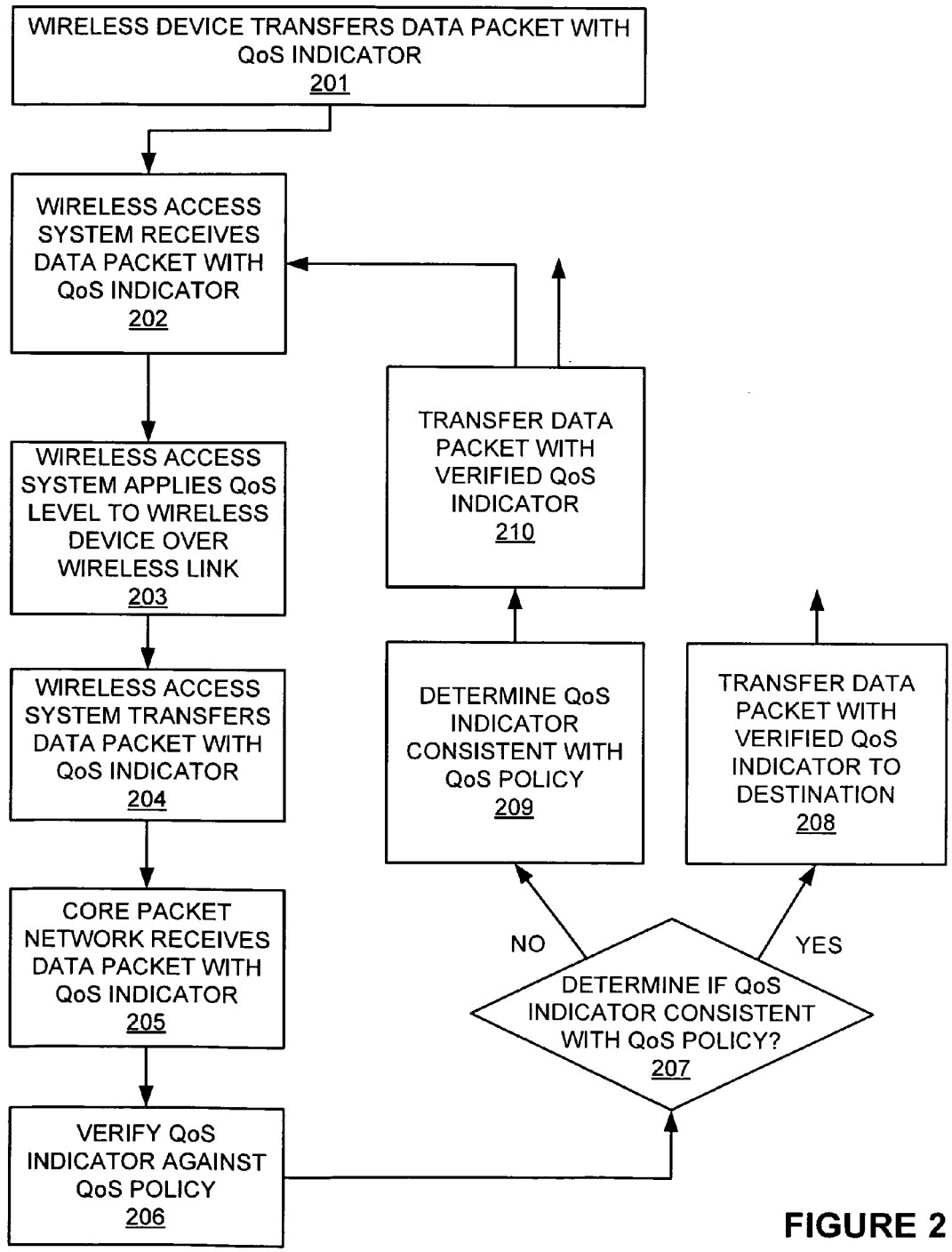
FIG. 2 is a flow diagram illustrating a method of operation of a communication system.

FIG. 2 is a flow diagram that illustrates a method of operation of communication system 100. In FIG. 2, wireless device 121 transfers (201) a data packet with a first quality-of-service (QoS) indicator over wireless link 131.

Wireless access system 111 receives (202) the data packet with the first quality-of-service indicator. Wireless access system 111 applies (203) a first level service to wireless device 121 over wireless link 131 based upon the first quality-of-service indicator. Wireless access system 111 transfers (204) the data packet with the first quality-of-service indicator over link 141. A level of service can be granted to the data packets in transit through communication system 100. This level of service could be indicated by a quality-of-service indicator in a data packet in transit on communication system 100. The level of service given to the data packets can vary on the communication medium, the level of service purchased by a user, or other factors. For example, the level of service given to wireless device 121 over wireless links 131 could be based upon wireless power level, allotted timeslots and scheduling in the wireless communication channels, data rate allowances, data type priority (for example, voice versus data), relegating wireless device 121 to a particular frequency or channel when communicating over wireless link 131, or other factors—including combinations thereof.

Core packet network 101 receives (205) the data packet with the first quality-of-service indicator. Core packet network 101 then verifies (206) the first quality-of-service indicator against a quality-of-service policy for wireless device 121. Core packet network 101 then determines (207) if the first quality-of-service indicator is consistent with the quality-of-service policy for wireless device 121. This determination includes retrieving the quality-of-service policy for wireless device 121 from quality-of-service policy system 160. If the first quality-of-service indicator is not consistent with the quality-of-service policy for wireless device 121, core packet network 101 determines (209) a second quality-of-service indicator consistent with the quality-of-service policy. Core packet network 101 transfers (210) the data packet with the second (verified) quality-of-service indicator over link 141.

Wireless access system 111 receives (202) the data packet with the second quality-of-service indicator. Wireless access system 111 then applies (203) a second level of service to wireless device 121 over wireless link 131 based upon the second quality-of-service indicator.

There are various ways of handling the data packet after receipt by wireless access system 111. For example, wireless access system 111 could re-transfer (204) the data packet with second quality-of-service indicator over link 141. The above method of operation of communication system 100 repeats when core packet network 101 receives the data packet with the second quality-of-service indicator and operates as discussed above. In another example, wireless access system 111 could discard the data packet received with second quality-of-service indicator instead of re-transferring (204). In another example, wireless access system 111 could transfer another communication packet to core packet network 101 to acknowledge receipt of the second quality-of-service indicator.

Once the quality-of-service indicator, as received by core packet network 101, is consistent with the quality-of-service policy for wireless device 121, core packet network transfers (208) the data packet with the verified quality-of-service indicator. Core packet network could be further configured to apply a level of service to the data packet consistent with the verified quality-of-service indicator. The data packet and verified quality-of-service indicator are transferred, possibly to external system 190 over link 191, depending upon the destination of the data packet. The data packet could also be transferred to any number of other destinations, including wireless access systems 111 over link 141.

It should be understood that the above description of FIG. 2 could occur in a different order than or in combined steps herein described in order to achieve proper operation of communication system 100.

Figure 3:
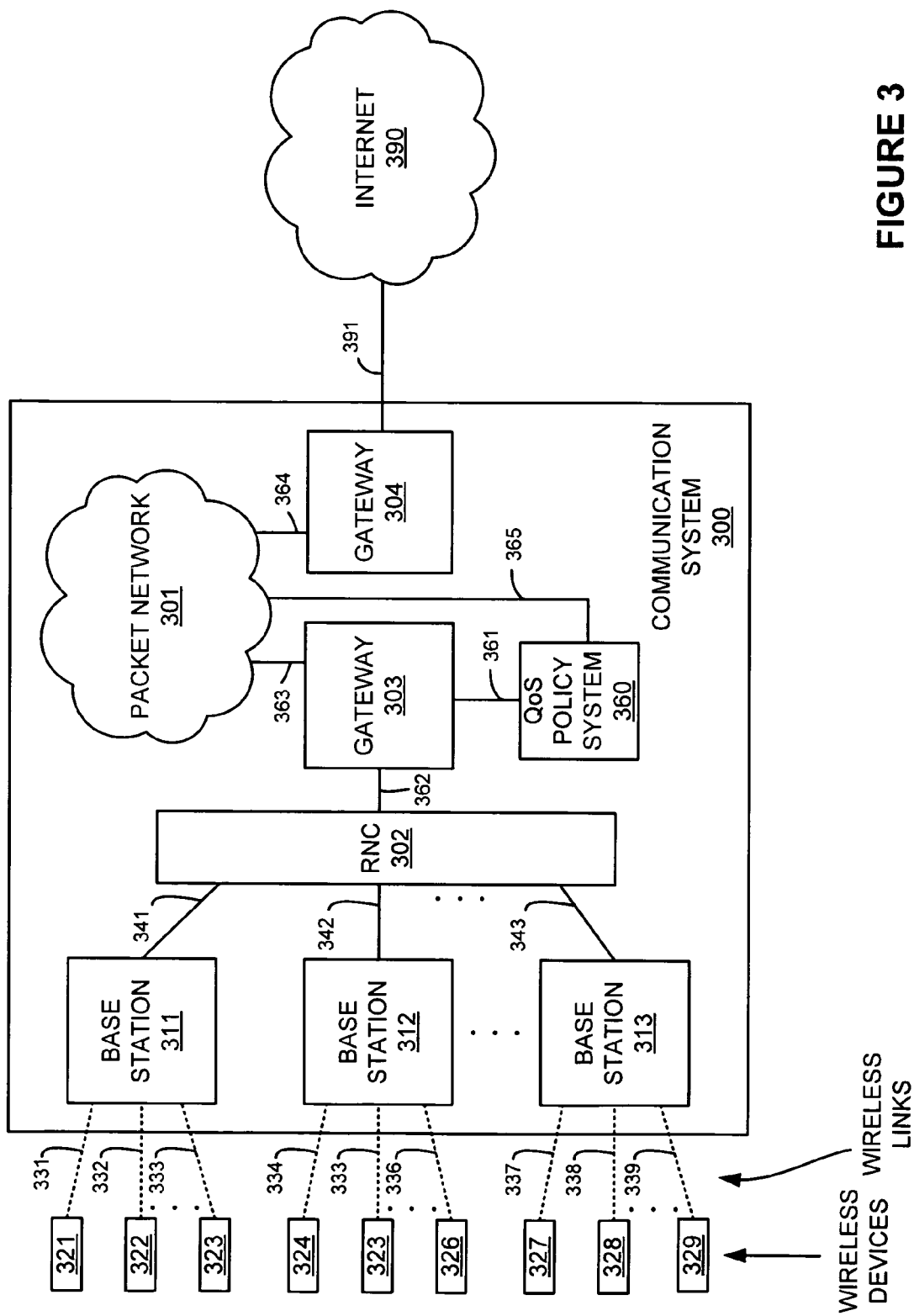
FIG. 3 is a system diagram illustrating a communication system.

FIG. 3 is a block diagram that illustrates communication system 300. Communication system 300 includes packet network 301, radio node controller (RNC) 302, gateways 303 and 304, base stations 311-313, and quality-of-service (QoS) policy system 360. FIG. 3 also shows wireless devices 321-329 and Internet 390. Wireless devices 321-323 and base station 311 communicate over wireless links 331-333. Wireless devices 324-326 and base station 312 communicate over wireless links 334-336. Wireless devices 327-329 and base station 313 communicate over wireless links 337-339. Base stations 311-313 and radio node controller 302 communicate over links 341-343. Radio node controller 302 and gateway 303 communicate over link 362. Gateway 303 and packet network 301 communicate over link 363. Gateway 303 and quality-of-service (QoS) policy system 360 communicate over link 361. Gateway 304 and packet network 301 communicate over link 364. Packet network 301 and quality-of-service (QoS) policy system 360 communicate over link 365. Gateway 304 and Internet 390 communicate over link 391. It should be understood that a different number of wireless devices could communicate with a base station, a different number of base stations could communicate with radio node controller 302, and a different number of radio node controllers could communicate with gateway 303.

For example, data packets originating in wireless device 321 can be transferred over wireless link 331 to base station 311. Such data packets received in base station 311 can be transferred to packet network 301 through radio node controller 302 and gateway 303. Packet network 301, for example, can transfer data packets with gateways 303 and 304 over links 363 and 364, respectively. Gateway 304 can transfer data packets with Internet 390 over link 391.

Wireless links 331-339 use the air or space as the transport media. Wireless links 331-339 could use various protocols, such as wireless fidelity (WiFi), code division multiple access (CDMA), worldwide interoperability for microwave access (WiMAX), Internet, Internet protocol (IP), local-area network (LAN), telephony, or some other communication format—including combinations thereof. Links 341-343, 361-365, and 391 use various communication media, such as air, metal, optical fiber, or some other signal propagation path— including combinations thereof. Links 341-343, 361-365, and 391 use various protocols, such as Internet, Internet protocol, local-area network, telephony, optical networking, wireless communication, wireless fidelity, code division multiple access, worldwide interoperability for microwave access, or some other communication format—including combinations thereof. Links 341-343, 361-365, and 391 could be direct links or it might include various intermediate components, systems, and networks. Furthermore, link 361 could also be a logical link between gateway 303 and quality-of-service policy system 360, and be configured as a software or hardware interface, or some combination thereof.

A level of service can be granted to the data packets in transit through communication system 300. This level of service could be indicated by a quality-of-service indicator in a data packet in transit on communication system 300. The level of service given to the data packets can vary on the communication medium, the level of service purchased by a user, or other factors. For example, the level of service given to wireless device 321 over wireless links 331 could be based upon wireless power level, allotted timeslots and scheduling in the wireless communication channels, data rate allowances, data type priority (i.e. voice versus data), relegating wireless device 321 to a particular frequency or channel when communicating over wireless link 331, or other factors—including combinations thereof.

The level of service corresponding to the quality-of-service indicator could be handled on a wireless device basis or on a customer or user basis. In some cases, no distinction is made between the wireless device and the user of the wireless device, whereas in other cases, a distinction could be made.

Quality-of-service policy system 360 comprises a computer system or special purpose circuitry which may include a storage system, database, user service profile directory, or some other type of directory or listing—including combinations thereof. Quality-of-service policy system 360 could be located within packet network 301, or located remotely from packet network 301.

Figure 4:
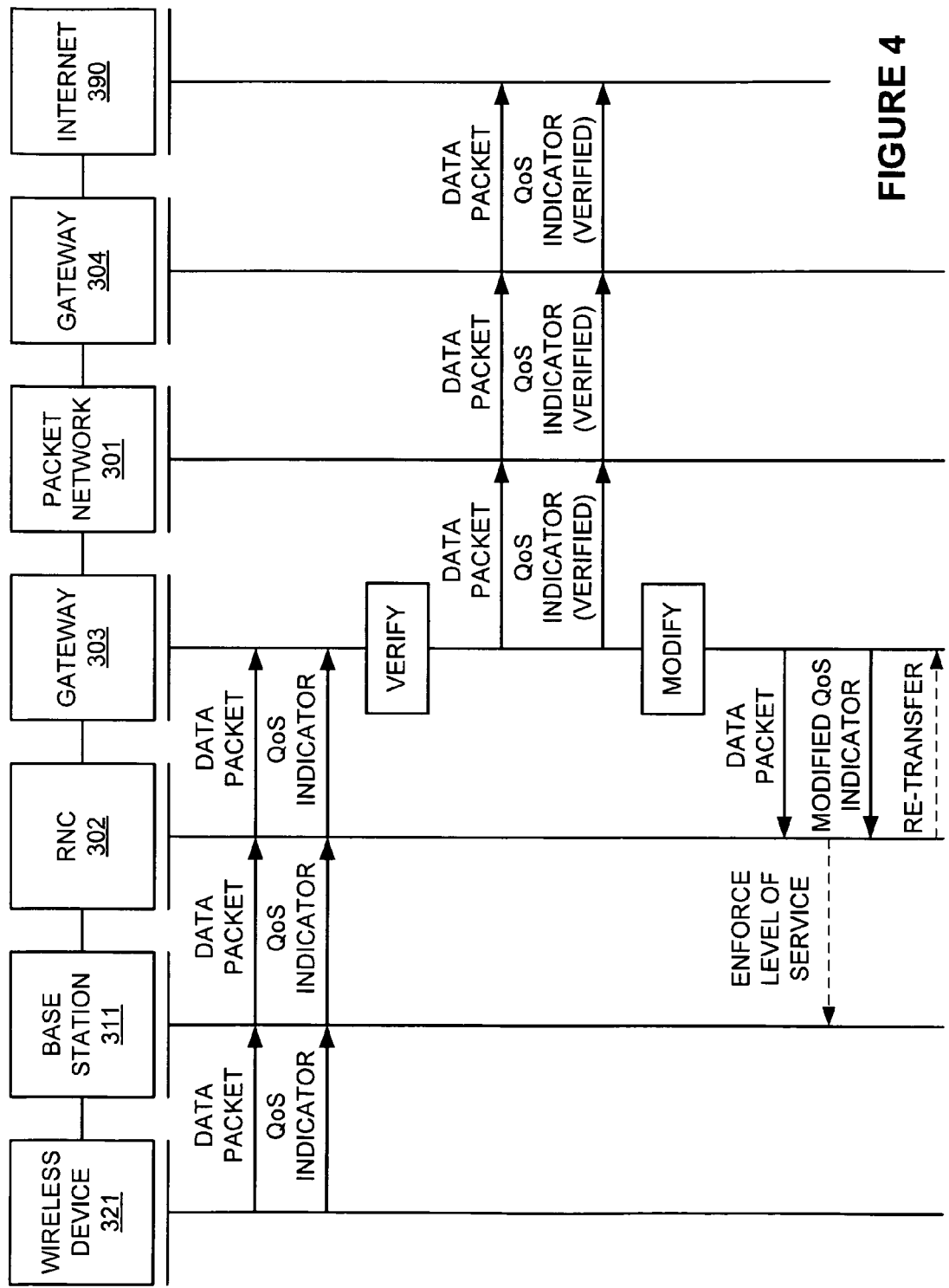
FIG. 4 is a sequence diagram illustrating a sequence of operation of a communication system.

FIG. 4 is a sequence diagram that shows an example sequence of operation of communication system 300 as illustrated in FIG. 3. A data packet originates in wireless device 321 and is accompanied by a first quality-of-service (QoS) indicator. The data packet could contain any number of different varieties of data types. For example, the data packet could contain data including video, audio, email, textual, or chat data, or contain web page traffic, or be a Voice over IP (VoIP) packet. The quality-of-service indicator can be sourced from wireless device 321 as a function of the configuration of wireless device or may be indicated by a user of wireless device 321.

Wireless device 321 transfers the data packet and first quality-of-service indicator over wireless link 331. The level of service given to the data packets over link 331 can vary on the communication medium, the level of service purchased by a user, or other factors. For example, the level of service given to wireless device 321 over wireless links 331 could be based upon wireless power level, allotted timeslots and scheduling in the wireless communication channels, data rate allowances, data type priority (i.e. voice versus data), relegating wireless device 321 to a particular frequency or channel when communicating over wireless link 331, or other factors—including combinations thereof.

Base station 311 receives the data packet and the first quality-of-service indicator. Base station 311 gives wireless device 321 a level of service over wireless link 331 consistent with the first quality-of-service indicator. Base station 311 then transfers the data packet and first quality-of-service indicator. Radio node controller 302 receives and transfers the data packet and first quality-of-service indicator.

Gateway 303 receives the data packet and first quality-of-service indicator. In gateway 303, the first quality-of-service indicator is checked against a quality-of-service policy for wireless device 321. Gateway 303 can accomplish this checking, for example, by identifying wireless device 321 and then retrieving the quality-of-service policy from quality-of-service policy system 360 over link 361. Gateway 303 could also retrieve the quality-of-service policy from quality-of-service policy system 360 over link 365 by way of packet network 301.

If the first quality-of-service indicator, as received by gateway 303, is not consistent with the quality-of-service policy for wireless device 321, then the quality-of-service indicator is modified to a second quality-of-service indicator to be consistent with the quality-of-service policy for wireless device 321. The data packet with the second quality-of-service indicator (now modified and verified) is then transferred back to radio node controller 302.

Radio node controller 302 receives the data packet with the second quality-of-service indicator. Radio node controller 302 then enforces a second level of service to wireless device 321 over wireless link 331 based upon the second quality-of-service indicator. This enforcement of the proper level of service can be accomplished, for example, by relaying to base station 311 the second quality-of-service indicator, or by directly controlling base station 311, among other methods. Radio node controller 302 could further re-transfer the data packet with second quality-of-service indicator over link 362.

Once the quality-of-service indicator, as received by gateway 303, is consistent with the quality-of-service policy for wireless device 321, gateway 303 could be further configured to apply a level of service to the data packet consistent with the verified quality-of-service indicator and transfer the data packet with the verified quality-of-service indicator. The data packet and verified quality-of-service indicator are transferred, possibly to Internet 390, depending upon the destination of the data packet. The data packet could also be transferred to any number of other destinations, including base stations 311-313. The data packet then receives a level of service in gateways 303 and 304, packet network 301, and over links 362, 363, 364, and 391 consistent with the verified quality-of-service indicator.

When gateway 303 transfers the data packet with the second (now verified) quality-of-service indicator back over link 362, the data packet with the second quality-of-service indicator could be received on a different interface of radio node controller 302 from which the data packet with the first quality-of-service indicator was transferred, or could be received on the same interface. For example, the different interface could be a different cable, wire, port, or input on radio node controller 302. If the data packet is received on a different port on radio node controller 302, for example, this would indicate to radio node controller 302 that the quality-of-service indicator has been adjusted and level of service of certain wireless links should be modified accordingly. The data packet could also include such information or payloads as the destination and source addresses, a new quality-of-service indicator, or other indicators to allow radio node controller 302 to recognize the data packet indicates a new quality-of-service is requested for a specific wireless device or wireless link.

The data packet received by gateway 303 with the first quality-of-service indicator could be the same data packet that gateway 303 transfers with the second quality-of-service indicator back over link 362 and received by radio node controller 302. The data packet with the second quality-ofservice indicator transferred by gateway 303 back over link 362 could also be encapsulated by another data or communications packet, or the second quality-of-service indicator alone can be transferred in a special purpose communications packet over link 362 and received by radio node controller 302.

It should be understood that any number of data packets originating in wireless devices 321-329 could simultaneously be transferred over their respective wireless links 311-313. Radio node controller 302 and gateway 303 could then receive these data packets and handle according to the methods and operations as described herein. Also, data packets originating in packet network 301 or Internet 390 would receive similar treatment on passage through system 300 when destined for equipment in system 300 or wireless devices 321-329.

Although not required, in some examples of the quality-of-service indicator, the quality-of-service indicator includes the Differentiated Services Code Point (DSCP) field in an IP data packet header. In other examples, a Multi Protocol Label Switching (MPLS) prefix of a data packet could contain a quality-of-service indicator.

Advantageously, a communication system as described herein can monitor and verify the quality-of-service indicator to prevent a data packet from receiving the wrong level of service. An unintentional or intentional manipulation of the quality-of-service indicator (for example, the DSCP field or MPLS prefix) can have the effect of a data packet receiving the wrong level of service than it should. This can lead to a customer using packet-based equipment in a communication system receiving a different priority scheduling or port selection, among other service factors, and a customer using wireless-based equipment in a communication system receiving different power allowances, channel allotment, or frequency selections, among other service factors. This could lead to the customer receiving a higher level of service than purchased or to less efficient use of network equipment.

Figure 5:
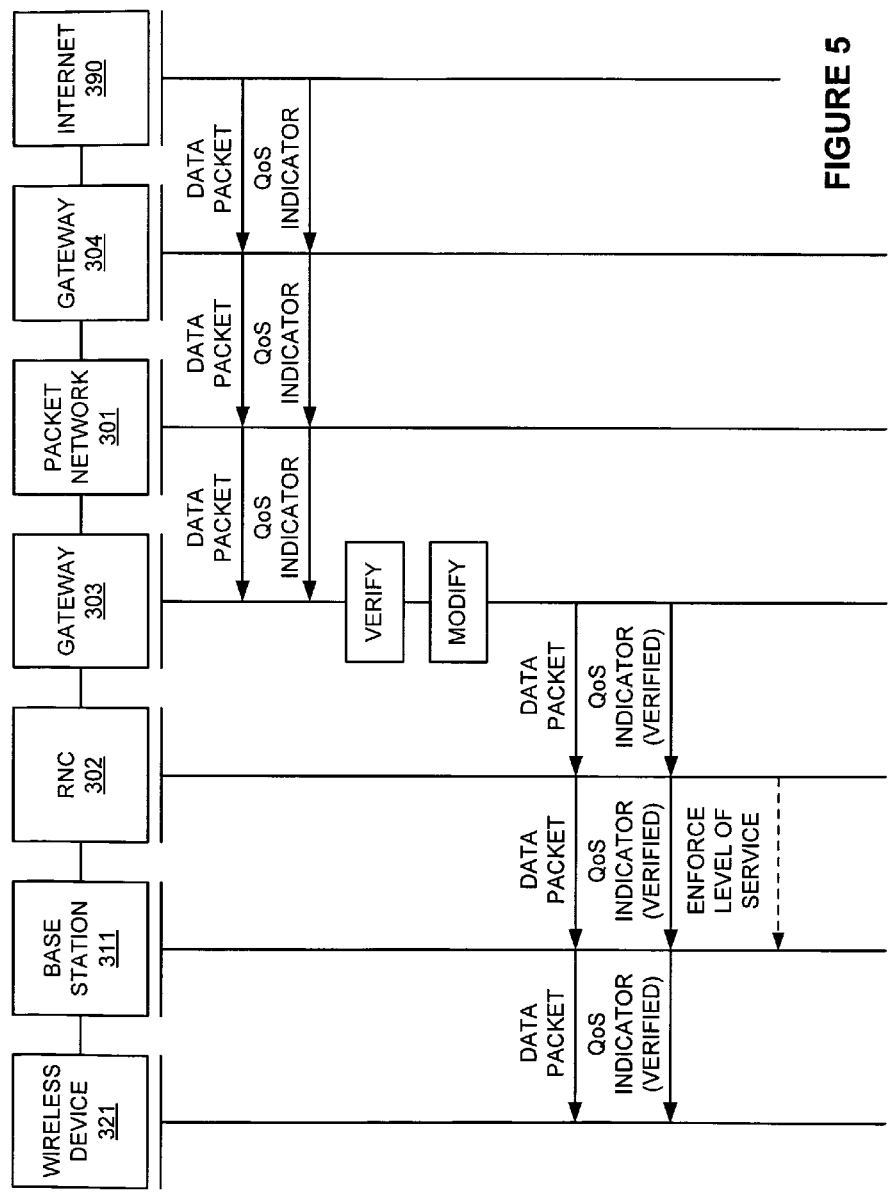
FIG. 5 is a sequence diagram illustrating a sequence of operation of a communication system.

FIG. 5 is a sequence diagram that shows an example sequence of operation of communication system 300 as illustrated in FIG. 3. A data packet, which indicates a destination of wireless device 321, originates in Internet 390 with a possibly unverified, first quality-of-service (QoS) indicator. The quality-of-service indicator could be sourced, for example, from a user, equipment, or service provider communicating with Internet 390.

The data packet is then transferred via gateway 304 through packet network 301. The data packet receives a level of service in gateways 304, packet network 301, and over links 363, 364, and 391 consistent with the unverified, first quality-of-service indicator.

Gateway 303 receives the data packet and first quality-of-service indicator. Gateway 303 would recognize that the data packet is bound for wireless device 321. In gateway 303, the first quality-of-service indicator then is verified against a quality-of-service policy for wireless device 321. Gateway 303 can accomplish this verification, for example, by identifying wireless device 321 and then retrieving the quality-of-service policy from quality-of-service policy system 360 over link 361. Gateway 303 could also retrieve the quality-of-service policy from quality-of-service policy system 360 over link 365 by way of packet network 301.

If the first quality-of-service indicator, as received by gateway 303, is not consistent with the quality-of-service policy for wireless device 321, then the quality-of-service indicator is modified to a second quality-of-service indicator to be consistent with the quality-of-service policy for wireless device 321. The data packet with the second quality-of-service indicator (now modified and verified) is then transferred over link 362. The data packet receives a level of service in gateways 303 and over link 362 consistent with the verified, second quality-of-service indicator. If the first quality-of-service indicator, as received by gateway 303, is consistent with the quality-of-service policy for wireless device 321, then the data packet is transferred without modification to the quality-of-service indicator.

Radio node controller 302 receives the data packet with the quality-of-service indicator. Radio node controller 302 then enforces a level of service to wireless device 321 over wireless link 331 based upon the quality-of-service indicator as received. This enforcement of the proper level of service can be accomplished, for example, by relaying to base station 311 the quality-of-service indicator, or by directly controlling base station 311, among other methods. If radio node controller 302 controls base station 311 directly, in some examples, the quality-of-service indicator might not be transferred further.

Base station 311 receives the data packet and possibly the quality-of-service indicator. Base station 311 gives wireless device 321 a level of service over wireless link 331 consistent with the quality-of-service indicator. Base station 311 then transfers the data packet and possibly the quality-of-service indicator over wireless link 331.

Wireless device 321 receives the data packet and possibly the quality-of-service indicator over wireless link 331. The level of service given to the data packets over link 331 can vary on the communication medium, the level of service purchased by a user, or other factors. For example, the level of service given to wireless device 321 over wireless links 331 could be based upon wireless power level, allotted timeslots and scheduling in the wireless communication channels, data rate allowances, data type priority (i.e. voice versus data), relegating wireless device 321 to a particular frequency or channel when communicating over wireless link 331, or other factors—including combinations thereof.

FIGS. 1-5 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A communication system, comprising:
    a wireless access system configured to receive a data packet with a first quality-of-service indicator value from a wireless device over a wireless link, provide a first level of service to the wireless device over the wireless link based on the first quality-of-service indicator, and transfer the data packet with the first quality-of-service indicator for delivery to a core packet network;
    the core packet network configured to receive the data packet with the first quality-of-service indicator and determine if the first quality-of-service indicator is consistent with a quality-of-service policy for the wireless device;
    the core packet network configured, if the first quality-of-service indicator is not consistent with the quality-of-service policy for the wireless device, to determine a second quality-of-service indicator consistent with the quality-of-service policy for the wireless device, and transfer the data packet with the second quality-of-service indicator to the wireless access system for redelivery;

the wireless access system configured to receive the data packet with the second quality-of-service indicator, provide a second level of service to the wireless device over the wireless link based on the second quality-of-service indicator, and transfer the data packet with the second quality-of-service indicator for delivery to the core packet network.

2. The communication network of claim 1, wherein the core packet network is further configured to identify the wireless device and retrieve a quality-of-service policy for the wireless device.

3. The communication network of claim 2, wherein the first quality-of-service indicator comprises a Differentiated Services Code Point (DSCP) field of a header of the IP packet.

4. The communication network of claim 2, wherein the first quality-of-service indicator is contained within a Multi Protocol Label Switching (MPLS) prefix.

5. The communication network of claim 1, wherein if the first quality-of-service indicator is consistent with the quality-of-service policy for the wireless device, the core packet network further configured to apply a third level of service to the data packet consistent with the first quality-of-service indicator and transfer the data packet with the first quality-of-service indicator.

6. The communication network of claim 1, wherein the data packet comprises an IP packet.

7. The communication network of claim 1, wherein the wireless access system comprises a radio node controller.

8. The communication network of claim 1, wherein the quality-of-service policy for the wireless device is contained within a user service profile directory.

9. The communication network of claim 1, wherein the core packet network comprises an IP network.

10. The communication network of claim 1,
wherein if the first quality-of-service indicator is not consistent with the quality-of-service policy for the wireless device, the core packet network further configured to encapsulate the data packet and the second quality-of-service indicator in a communication packet and transfer the communication packet containing the data packet and the second quality-of-service indicator to the wireless access system for redelivery.

11. A method of operating a communication system, comprising:
in a wireless device, transferring a data packet with a first quality-of-service indicator over a wireless link;
in a wireless access system, receiving the data packet with the first quality-of-service indicator, applying a first level of service to the wireless device over the wireless link based on the first quality-of-service indicator, and transferring the data packet with the first quality-of-service indicator for delivery to a core packet network;
in the core packet network, receiving the data packet with the first quality-of-service indicator and determining if the first quality-of-service indicator is consistent with a quality-of-service policy for the wireless device;
wherein if the first quality-of-service indicator is not consistent with the quality-of-service policy for the wireless device, determining a second quality-of-service indicator consistent with the quality-of-service policy for the wireless device, and transferring the data packet with the second quality-of-service indicator to the wireless access system for redelivery;
in the wireless access system, receiving the data packet with the second quality-of-service indicator, providing a second level of service to the wireless device over the wireless link based on the second quality-of-service indicator, and transferring the data packet with the second quality-of-service indicator for delivery to the core packet network.

12. The method of operating the communication system of claim 11, further comprising: in the wireless access system, identifying the wireless device and retrieving a quality-of-service policy for the wireless device.

13. The method of operating the communication system of claim 12, wherein the first quality-of-service indicator comprises a Differentiated Services Code Point (DSCP) field of a header of the IP packet.

14. The method of operating the communication system of claim 12, wherein the first quality-of-service indicator is contained within a Multi Protocol Label Switching (MPLS) prefix.

15. The method of operating the communication system of claim 11, wherein if the first quality-of-service indicator is consistent with the quality-of-service policy for the wireless device, applying a third level of service to the data packet consistent with the first quality-of-service indicator, and transferring the data packet with the first quality-of-service indicator.

16. The method of operating the communication system of claim 11, wherein the data packet comprises an IP packet.

17. The method of operating the communication system of claim 11, wherein the wireless access system comprises a radio node controller.

18. The method of operating the communication system of claim 11, wherein the quality-of-service policy for the wireless device is contained within a user service profile directory.

19. The method of operating the communication system of claim 11, wherein the core packet network comprises an IP network.

20. The method of operating the communication system of claim 11,
wherein if the first quality-of-service indicator is not consistent with the quality-of-service policy for the wireless device, encapsulating the data packet and the second quality-of-service indicator in a communication packet and transferring the communication packet containing the data packet and the second quality-of-service indicator to the wireless access system for redelivery.

* * * * *